US006795851B1

(12) United States Patent
Noy (10) Patent No.: US 6,795,851 B1
(45) Date of Patent: Sep. 21, 2004

(54) WEB-BASED CLIENT/SERVER COMMUNICATION CHANNEL WITH AUTOMATED CLIENT-SIDE CHANNEL ENDPOINT FEATURE DETECTION AND SELECTION

(75) Inventor: Oded Noy, Los Angeles, CA (US)

(73) Assignee: Path Communications Inc., Los Angeles, CA (US)

( * ) Notice: Subject to any disclaimer, the term of this patent is extended or adjusted under 35 U.S.C. 154(b) by 539 days.

(21) Appl. No.: 09/596,763

(22) Filed: Jun. 19, 2000

(51) Int. Cl.⁷ .............................................. G06F 15/16
(52) U.S. Cl. .................. 709/218; 709/219; 709/230
(58) Field of Search ............................... 709/218, 219, 709/227, 238, 230, 239, 220, 217

(56) References Cited

U.S. PATENT DOCUMENTS

| | | | |
|---|---|---|---|
| 5,442,637 A | * 8/1995 | Nguyen | 714/708 |
| 5,754,830 A | 5/1998 | Butts et al. | |
| 5,805,829 A | 9/1998 | Cohen et al. | |
| 5,854,750 A | 12/1998 | Phillips et al. | |
| 5,931,913 A | 8/1999 | Meriwether et al. | |
| 5,938,736 A | 8/1999 | Muller et al. | |
| 5,940,075 A | 8/1999 | Mutschler, III et al. | |
| 5,958,013 A | * 9/1999 | King et al. | 709/227 |
| 5,964,836 A | 10/1999 | Rowe et al. | |
| 5,974,256 A | 10/1999 | Matthews et al. | |
| 5,978,834 A | 11/1999 | Simonoff et al. | |
| 6,128,653 A | * 10/2000 | del Val et al. | 709/219 |
| 6,507,833 B1 | * 1/2003 | Hichwa et al. | 707/1 |
| 6,529,950 B1 | * 3/2003 | Lumelsky et al. | 709/218 |

* cited by examiner

*Primary Examiner*—Zarni Maung
(74) *Attorney, Agent, or Firm*—Liu & Liu (57) ABSTRACT

A TCP/IP-based software application client/server communication channel construction mechanism is presented. The mechanism constructs a dedicated bi-directional data transmission for a single client/server session. The server software, running on a server host computer, provides session-based data services to one or more software clients. The client process supports one or more execution environments including: text-based scripting, Java or ActiveX components. The invoked code executing within the client computer detects the most attractive execution environment available within its execution environments, and uses the services of that execution environment client process to establish an optimal communication channel back to the server software process. Depending on the execution environment(s) available to the invoked code, the communication channel may be: (a) a content-independent, bi-directional transmission control protocol (TCP) connection, or (b) a content-dependent TCP connection, such as a TCP connection supporting only a single HTTP request/response pair.

20 Claims, 5 Drawing Sheets

WEB-BASED CLIENT/SERVER COMMUNICATION CHANNEL WITH AUTOMATED CLIENT-SIDE CHANNEL ENDPOINT FEATURE DETECTION AND SELECTION

BACKGROUND OF THE INVENTION

1. Field of the Invention

The present invention relates to communication in information exchange systems, particularly to communication in distributed network systems, and more particularly to communication in distributed network systems with Web-based (e.g., Hypertext Transmission Protocol, HTTP) communications components.

2. Description of Related Art

With the popularity of the Internet, it has fueled a great demand in business-to-business and business-to-consumer Internet applications. Many organizations have established Web-based distributed applications for dissemination or collection of information, or to extend remote control and command capabilities of processes through Web-based interfaces. For many such distributed systems it is desirable to establish optimized communication channels between the client-side user agent process and a server-side process. Optimized channels ensure that a minimum of data needs to be transmitted through the network between the client and server processes, and also ensures that data is transferred quickly and efficiently from a client-side user agent process to a server process.

In the past, one common technique for establishing optimized communication channels between a client-side user agent process and a server-side process is to provide multiple, well-known connection points for a distributed system. This technique requires the user to choose a communication channel type, usually by choosing from amongst a set of contenders available through a user interface. For example, a server may publish an HTML page through an HTTP server, wherein several different links are available. One link is to be used by users who know their user agent software (e.g., a "browser") supports a particular scripting language. Another link to be used by users who know their user agent software supports a Java Applet execution environment. Several other links may also be made available. Such techniques require user interaction to indicate an execution environment that can support construction of a client/server communication channel. However, user interaction is not desirable because users may be ignorant of the ramifications of different choices. Users may also incorrectly believe a particular execution environment is made available through the user agent software.

Another common technique in the past involves the server-side software remotely determining which client-side execution environment is available. Such systems often rely on user agent software reporting its type and even version to the server process. Either through empirically defined lookup tables or more heuristic decision trees, the server software selects an execution environment likely to be available within the client's user agent process, and targets content towards that execution environment. Use of such techniques can be very difficult on server-side software administrators and content developers. First of all, the heuristic algorithms or empirically derived feature tables must be developed and tested, which can be a long and expensive operation. Second, continual changes to the concept and available features of different user agent software packages require the continual maintenance of the server-side mechanisms. Both problems can only be solved through continuous dedication of a relatively large amount of resources.

Accordingly, it is desirable to create a process that provides a more efficient mechanism by which the client-side channel endpoint feature is automatically detected and an optimal protocol is automatically selected to establish a communication channel with the server process.

SUMMARY OF THE INVENTION

The present invention is directed to an improved system and method for establishing client/server communication channel in information exchange systems. In accordance with one aspect of the present invention, a client/server communication channel is established in a distributed network environment by deploying a communication agent at the client side for automatically determining the client-side endpoint feature and selecting the optimal (e.g., most efficient and stable) communication protocol based on such feature (e.g., client configuration, firewall, Applet support, browser type). The communication agent may have a relatively small file size on the order of 10 Kb.

In another aspect of the present invention, a full duplex (two-way) client/server communication is established which requires no installation on the client-side. The communication agent is configured to stay connected to the server for the duration of the session, if the client provides an executable environment capable of establishing full duplex connections to the server. This eliminates the unnecessary, network intensive opening and closing of connections for every client request (which includes many router-hopes for most Web users). The complex logic of software applications may be maintained at the server end for continuous access by the clients. Further, keeping the connection active means that the server can create a virtual aggregate of users. This features enables the server to supply publish and subscribe capabilities as well as other full duplex communications with the complex logic at the server end and a thin-client at the client-side. As long as clients are connected, no polling is required by the client to receive notification from the server.

In another aspect of the present invention, the communication agent comprises a cascading user interface that determines the most efficient and stable way to connect to the server (e.g., from an 8 Kb applet, an ActiveX control to a Java Script client). The cascading interface is configured to allow the server to supply different levels of service to the client based on the client environment. A universal Java Script translator may be provided to translate server commands or requests to Java Script in case Applet cannot be run on the client-side. This feature allows deployment of a single solution that is supported whether the client is capable of running Applets.

In yet another embodiment of the present invention, the communication agent further comprises a browser integrator that enables the communication agent to detect activities within the browser such as simple navigation, frame structures, data field synchronization and dynamic images.

In a further aspect of the present invention, a number of clients can stay connected to the server via one or more other clients. The clients are extensions of the generic communication agent, and allow application specific implementations. The server can interact differently with each client, allowing many layers of customization of the server by way of the intermediate client(s) connected between a client and the server.

In one embodiment of the present invention, a TCP/IP-based software application client/server communication channel construction mechanism is presented. The mechanism constructs TCP/IP-based channels dedicated to bi-directional data transmission for a single client/server session. The server software, running on a server host computer, provides session-based data services to one or more software clients. Client software processes initiate communications with the server software process through a recognized type of request in order to use the data services provided by the server software process. The server software process responds to the client's request with content including downloadable, executable code and invoking such executable code or invoking executable code already installed in the client computer. The dynamically invoked code targets a client process that supports one or more execution environments including: text-based scripting, Java dynamic component loading and execution, or dynamic download and execution of ActiveX components. The invoked code executing within the client computer detects the most attractive execution environment available within its execution environment, and uses the services of that execution environment client process to establish an optimal communication channel back to the server software process. Depending on the execution environment(s) available to the invoked code, the communication channel may be: (a) a content-independent, bi-directional transmission control protocol (TCP) connection, or (b) a content-dependent TCP connection, such as a TCP connection supporting only a single HTTP request/response pair. The downloaded code executing within the client process and the server process undergo handshaking correspondence through the newly established communication channel to bind a server-side session to the channel. The exact handshaking protocol is dependent on the type of connection the invoked code executing within the client machine was able to construct back to the server process.

DESCRIPTION OF THE ILLUSTRATED EMBODIMENT

The present description is of the best presently contemplated mode of carrying out the invention. This description is made for the purpose of illustrating the general principles of the invention and should not be taken in a limiting sense. The scope of the invention is best determined by reference to the appended claims.

The present invention substantially reduces the difficulties and disadvantages associated with other techniques of establishing optimal communication channels between server processes and user agent software that supports dynamic content, such as Web browsers. To facilitate an understanding of the principles and features of the present invention, they are explained herein below with reference to its deployments and implementations in illustrative embodiments. By way of example and not limitation, the present invention is described herein below in reference to examples of deployments and implementations in the Internet environment. The present invention can find utility in a variety of implementations without departing from the scope and spirit of the invention, as will be apparent from an understanding of the principles that underlie the invention.

Information Exchange Network

The detailed descriptions that follow are presented largely in reference to examples relating to information handling devices and information exchange systems in terms of methods or processes and symbolic representations of operations within information handling devices. These method descriptions and representations are the means used by those skilled in the data processing arts to most effectively convey the substance of their work to others skilled in the art.

A method or process is here, and generally, conceived to be a self-contained sequence of steps leading to a desired result. These steps require physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Useful devices for performing the operations of the present invention include, but are not limited to, general or specific purpose digital processing and/or computing devices, which devices may be standalone devices or part of a larger system. The devices may be selectively activated or reconfigured by a program, routine and/or a sequence of instructions and/or logic stored in the devices. In short, use of the methods described and suggested herein is not limited to a particular processing configuration.

Distributed information exchange networks that may be implemented with the public invention includes public and private computer networks (e.g., Internet, Intranet, WAN, LAN, etc.), value-added networks, communications networks (e.g., wired or wireless networks), broadcast networks, and a homogeneous or heterogeneous combination of such networks. As will be appreciated by those skilled in the art, the networks include both hardware and software and can be viewed as either, or both, according to which description is most helpful for a particular purpose. For example, the network can be described as a set of hardware nodes that can be interconnected by a communications facility, or alternatively, as the communications facility, or alternatively, as the communications facility itself with or without the nodes. It will be further appreciated that the line between hardware and software is not always sharp, it being understood by those skilled in the art that such networks and communications facility involve both software and hardware aspects. Prior to discussing details of the inventive aspects of the present invention, it is helpful to discuss one example of a network environment in which the present invention may be implemented.

Figure 1:
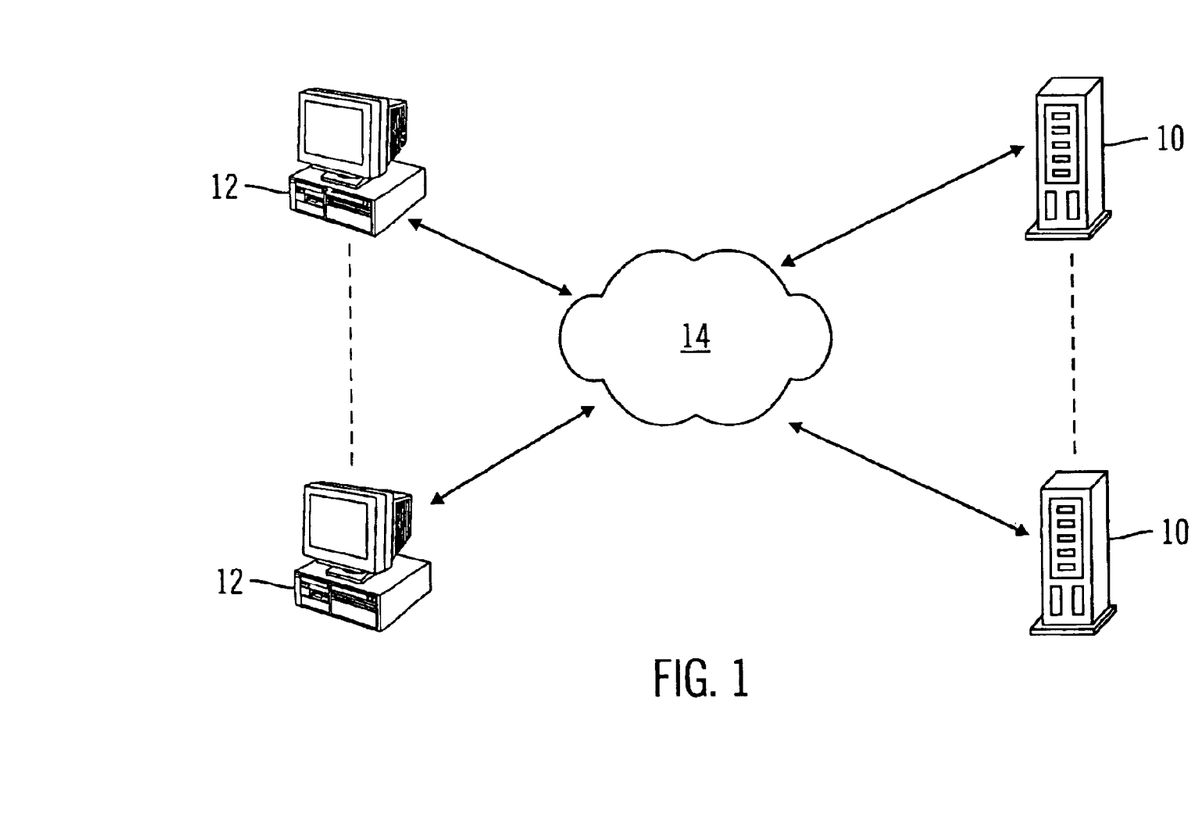
FIG. 1 is a schematic diagram of an example of a distributed information exchange network system in which the present invention is implemented.

The Internet is an example of an information exchange network including a computer network in which the present invention may be implemented, as illustrated schematically in FIG. 1. Many servers 10 are connected to many clients 12 via Internet network 14, which comprises a large number of connected information networks that act as a coordinated whole. Details of various hardware and software components comprising the Internet network 14 are not shown (such as servers, routers, gateways, etc.), as they are well known in the art. Further, it is understood that access to the Internet by the servers 10 and clients 12 may be via suitable transmission medium, such as coaxial cable, telephone wire, wireless RF links, or the like. Communication between the servers 10 and the clients 12 takes place by means of an established protocol. As will be noted below, the system of the present invention may be configured in or as one or more of the servers 10 and clients 12, which may be accessed by other clients 12 and servers 10. Some of the clients 12 and servers 10 may function as a client and/or server to other client(s) and/or server(s).

System Overview

The present invention is directed to an improved system and method for establishing client/server communication channel in information exchange systems. In accordance with one aspect of the present invention, a client/server communication channel is established in a distributed network environment by deploying a communication agent at the client side for automatically determining the client-side endpoint feature and selecting the optimal (e.g., most efficient and stable) communication protocol based on such feature (e.g., client configuration, firewall, Applet support, browser type). The communication agent may have a relatively small file size on the order of 10 Kb.

Figure 2:
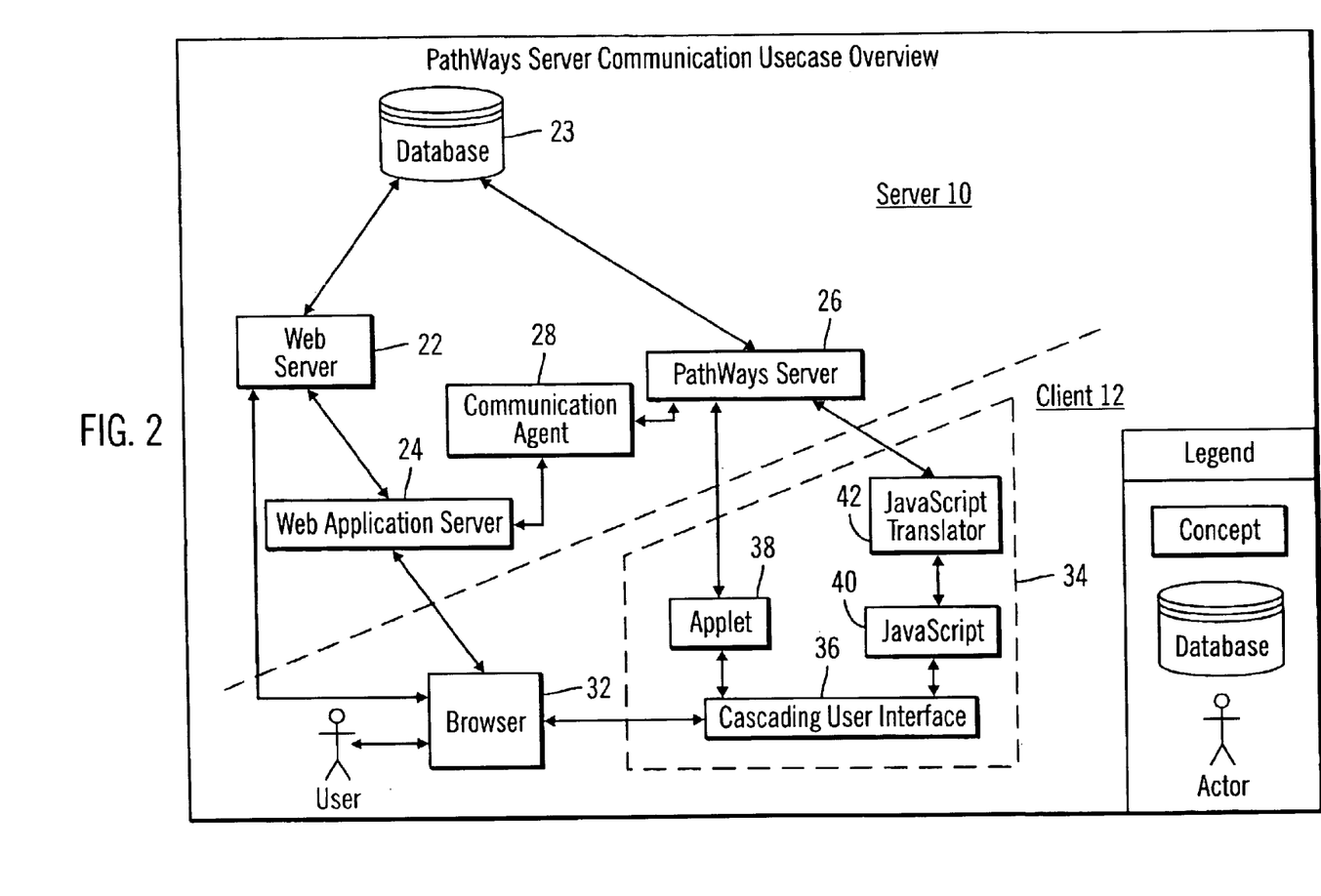
FIG. 2 is a schematic overview of the client/server system configuration.
Figure 3:
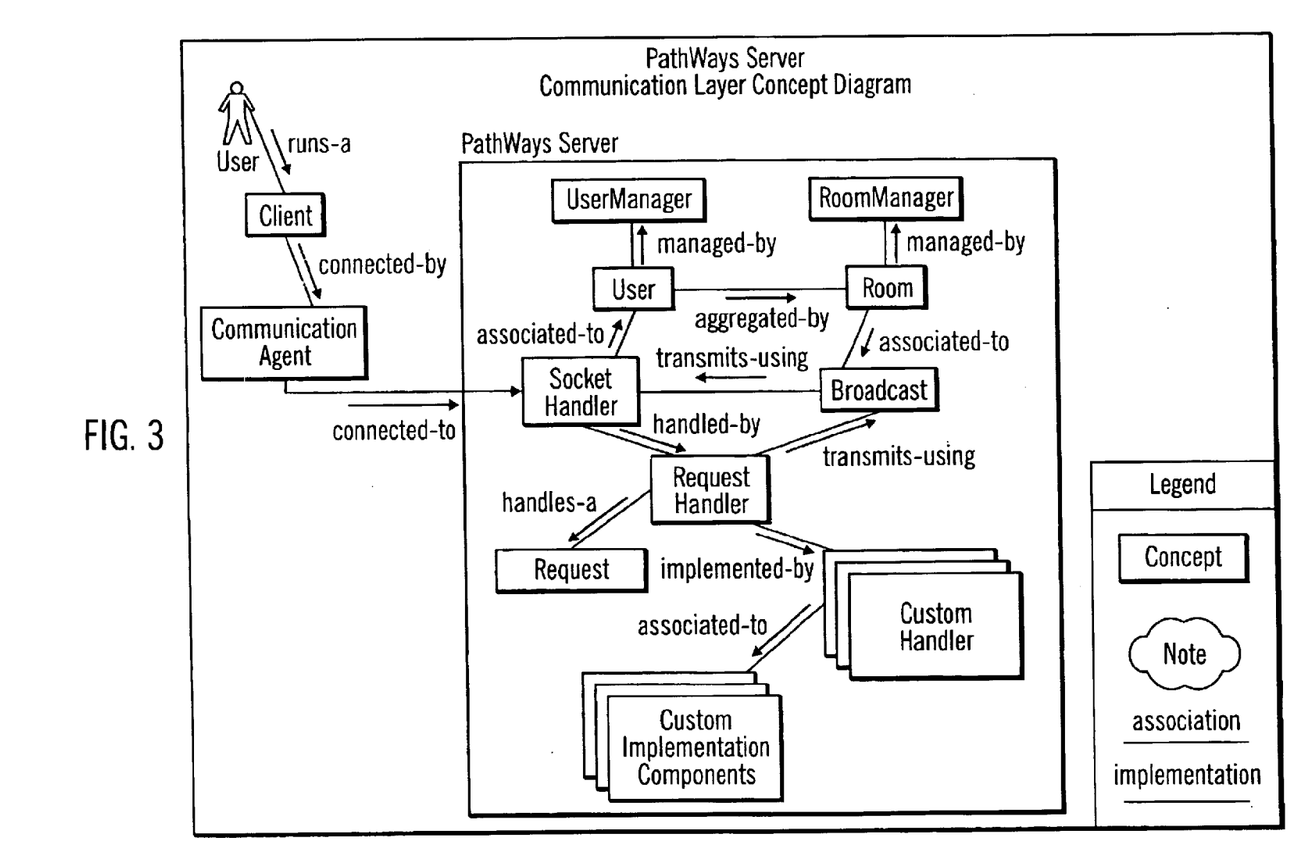
FIG. 3 is a concept diagram of the Pathways server communication layer, in accordance with one embodiment of the present invention.

Referring to FIG. 2, on the server side 10, there is a web server 22 that serves Web content stored in a database 23 to the user browser 32 or to a web application server 24 that communicates with the user browser 32. In the illustrated embodiment, a "Pathways server 26" serves the function of communicating with the communication agent 34 on the client side 12. Referring to FIG. 3, the communication layer concept of the Pathways server 26 is illustrated. The Pathways server serves certain contents from the database 23 (e.g., dynamic images, field content, etc.) to the client communication agent 34. There is a server side communication agent 28 that communicates between the Pathways server 26 and the web application server 24 to prepare the content for forwarding to the user browser 32 or the client side communication agent 34. Two or more of the web application server 24, web server 22 and Pathways server 26 may physically reside in the same hardware server unit, but having separate logical function as described.

It is to be understood that the Pathway server 26 is merely an example of a possible implementation of a communication layer, and not the only implementation. Different implementations are possible given the disclosure of the functions and features of the present invention, without departing from the scope and spirit of the present invention.

In another aspect of the present invention, the communication agent comprises a cascading user interface that determines the most efficient and stable way to connect to the server (e.g., from an 8 Kb applet, an ActiveX control to a Java Script client). The cascading interface is configured to allow the server to supply different levels of service to the client based on the client environment. A universal Java Script translator may be provided to translate server commands or requests to Java Script in case Applet cannot be run on the client-side. This feature allows deployment of a single solution that is supported whether the client is capable of running Applets.

Referring back to FIG. 2, on the client side 12, the client side communication agent 34 includes a cascading user interface 36 that interfaces between the user browser 32 and the Pathways server 26. More specifically, the cascading user interface works with Applet 38 or JavaScript 40 through a JavaScript translator 42. The server side communication agent 28 may adopt similar configuration as the client side communication agent 34.

Figure 4:
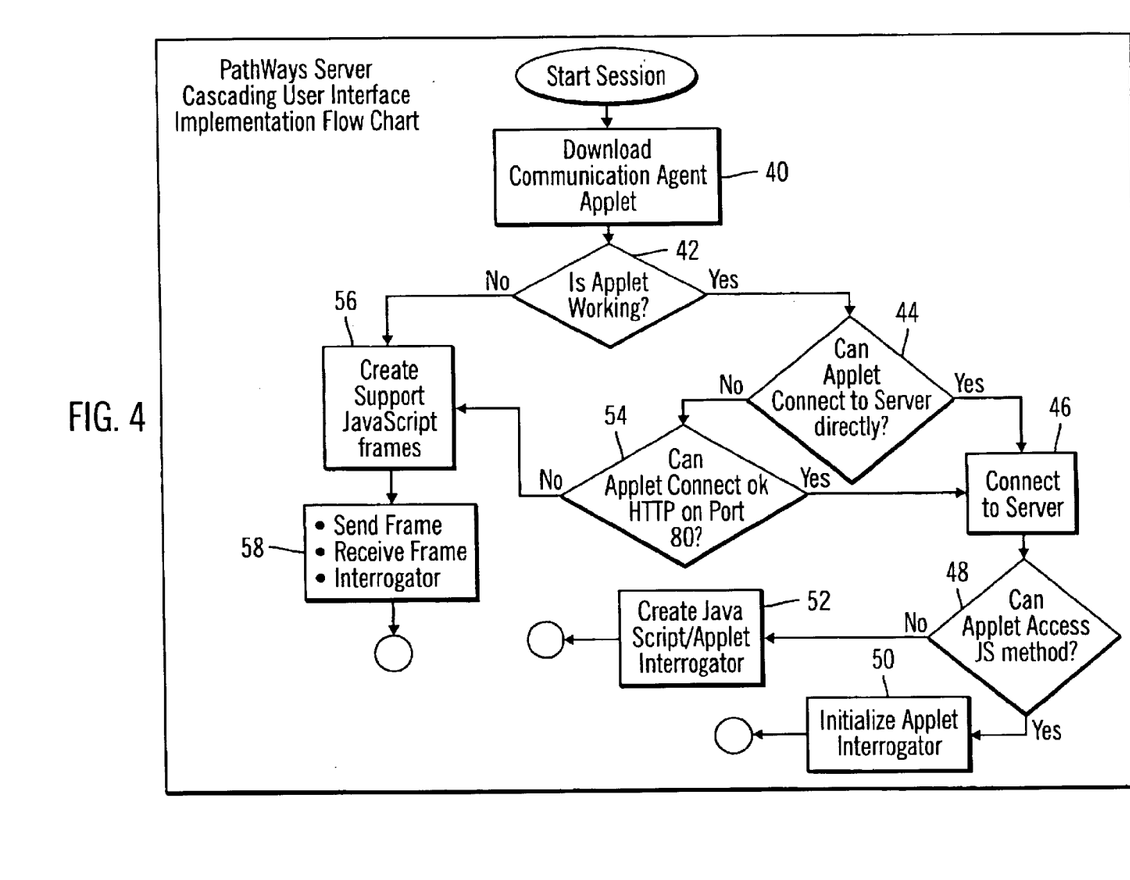
FIG. 4 is a flow diagram of the cascading user interface implementation.

Referring to FIG. 4, the implementation flowchart of the cascading user interface is illustrated. At the start of the client/server session, the client 12 downloads a communication agent in the form of an Applet at step 40. If the Applet is determined to be working at step 42, the Applet is tested to see if it can be connected to the server directly at step 44. If it can be, the client is connected to the server at step 46. If it is determined at step 48 that the Applet can access JavaScript objects, the Applet interrogator is initialized at step 50. If not, the JavaScript and Applet interrogator is created at step 52.

If at step 44 it was determined that the Applet cannot be connected to the server directly, then the Applet is check to see if it connects to HTTP on port 80 at step 54. If the result is positive, connection is made to the server at step 46. If the result is negative, support JavaScript frames are created at step 56. Frames may then be sent and received and interrogator created at step 58.

If Applet were determined to be not working at step 42, the steps of 56 and 58 would be followed. In order for the JavaScript code to get notified when the Applet is not working, the JavaScript code includes a timer method that tries to connect to the Applet. In order to avoid nm time errors as a result of racing conditions, a complete handshake solution between the Applet and the JavaScript code is implemented.

As will be explained in greater details below, a full duplex (two-way) client/server communication is established which requires no installation on the client-side. The communication agent is configured to stay connected to the server for the duration of the session, if the client provides an executable environment capable of establishing full-duplex connections to the server, e.g., using an Applet. This eliminates the unnecessary, network intensive opening and closing of connections for every client request (which includes many router-hopes for most Web users). The complex logic of software applications may be maintained at the server end for continuous access by the clients. Further, keeping the connection active means that the server can create a virtual aggregate of users. This features enables the server to supply publish and subscribe capabilities as well as other full duplex communications with the complex logic at the server end and a thin-client at the client-side. As long as clients are connected, no polling is required by the client to receive notification from the server.

In yet another embodiment of the present invention, the communication agent further comprises a browser integrator that enables the communication agent to detect activities within the browser such as simple navigation, frame structures, data field synchronization and dynamic images.

In a further aspect of the present invention, a number of clients can stay connected to the server via one or more other clients. The clients are extensions of the generic communication agent, and allow application specific implementations. The server can interact differently with each client, allowing many layers of customization of the server by way of the intermediate client(s) connected between a client and the server.

Further functions and considerations relating to the client/server process are described below.

Initial Contact and Sending Dynamic Content

The sequence for establishing a communication channel and binding it to a server-side session begins when a client user agent process contacts a server process, indicating a request to begin a new server-side session on behalf of the client, or indicating a request to continue a previously created server-side session on behalf of the client. The server may ignore or refuse the request if it is well formed according to the protocol specification being used for initial contact. The server process may also ignore or refuse the request for application-specific reasons.

If the server accepts the request, then the server responds with dynamic content. The dynamic content is code that is to start the process of establishing a communication channel from the client to the server. The dynamic content is to run within an execution environment provided by the client process.

The currently preferred implementation of the invention has the server process responding to a client's initial request (an HTTP request with a discriminated URI) with an HTML page including both dynamic scripting code and a reference to Java Applet code. This embodiment of the invention assumes a client-side user agent process provides an execution environment for either Java code, dynamic scripting code, or both. The Applet code, if executed, runs within a Java virtual machine. The Java code attempts to establish a bi-directional TCP connection back to the server. If the Applet is not able to do this, then it attempts to create a series of HTTP request/response pairs. In this second case the applet is creating multiple individual connections to the server. In the aggregate, these individual HTTP transactions form a communication channel from the client to the server. If the client-side user agent process does not provide a Java virtual machine execution environment, then the dynamic scripting code is allowed to run instead. The dynamic scripting code establishes a communications channel in the form of a series of HTTP request/response pairs.

Binding the Channel to a Distributed Application Session

Once a communication channel is established with the server-side process, the client-side code and the server-side process perform initial handshaking through the communication channel in order to bind the channel to a distributed application session.

Binding a channel to a session is necessary for so-called stateful services provided by distributed applications. A stateful service stores information on behalf of a user. The client can send this information to the server once, and thereafter only a reference to the same information need be sent from the client. In addition, stateful services may store information about a client session. For example, if a client makes three remote requests, the server providing the requested service can log the fact that the same client made the three requests, when the requests were made, what the response was, etc.

The establishment of a bi-directional TCP connection over which more than one request may travel almost always implies the server is providing a stateful service. Any information sent as part of one request that is stored by the server, or any information derived from request data that is stored by the server, is state information. That information enjoys at least a temporary association with a unique TCP socket identifier that identifies the TCP connection over which the information came. The association of client-provided information (or information derived from client-provided information) to any kind of client identifier is referred to as a "session".

Preferred Types of Channels

It is assumed that a significant amount of processing, resources and/or computing time is required to establish a communication channel between a client process and a server process. Therefore it is advantageous to establish a communication channel once and re-use that channel as many times as is practical to service requests on behalf of a client. It is less efficient resource-wise to establish a unique communication channel and bind it to a session to service just a single request.

A network communication channel that costs less in terms of processing resources on the client- and/or the server-side of a distributed application is obviously preferred compared to a communication channel that is more expensive in terms of processing resources. The costs of a communication channel include:

1. The cost to establish the communication channel.
2. The cost to send each in a series of requests from the client process to the server process through the communication channel.
3. The cost to send each in a series of responses from the server process to the client process through the communication channel.
4. The cost to suspend a communication channel.
5. The cost to resume a previously suspended communication channel.
6. The cost to tear down the communication channel.

When judging the preference of one communication channel over another one can determine the relative expense of these six costs for each type of communication channel. Then one must determine the number of requests expected per channel and the number of suspend/resume cycles expected per channel for a particular distributed application's protocol. These comparisons will help establish the preferred communication channels.

Preference of Client-side Execution Environments

Different client-side code execution environments have different features in terms of the type of communication channels the execution environment can establish. For example, a typical Java virtual machine execution environment has the built-in capability to establish TCP-based communication channels, as well as multi-request/response communication channels tunneled over individual TCP connections (e.g., multiple HTTP requests with channel-identifying or session-identifying cookies). Dynamic scripting environments typically only have the built-in ability to create communication channels tunneled over multiple request/response transactions. Networked ActiveX execution environments typically also provide the ability to make TCP-based and tunneled, multi-part communication channels.

If one type of communication channel is preferred over another in terms of establishing a client/server communication channel (because of the relative costs associated with the channel types), then obviously an execution environment supporting the preferred channel type is preferred over an execution environment that only supports the less-preferred channel type.

When judging the preference of one client-side execution environment over another, there may be other factors also involved in the decision. The relative difficulty of development within one environment versus another, or the relative availability of professional talent proficient in one environment versus another may influence the relative preference of two otherwise equivalent execution environments.

Distributed Applications where this Invention is Applicable

In any distributed application where this invention can be applied, there are N different types of communication channels, which can be sequenced in an ordered list by placing the most-preferred type of communication channel at the beginning of the list, then the next-most preferred, and so on. Therefore:

ListN={most-preferred(N), second-most-preferred (N), . . . };

where N={n1, n2, n3, . . . }

Note that in order for there to be any communication whatsoever in the distributed application, $|N| \geq 1$. That is, there must be at least one type of communication channel that can be established between the client process and the server process.

In the same distributed system, there are up to M potential execution environments that may be provided by a client-side process. These execution environments are ordered in a list by placing the most-preferred execution environment first in the list, then the next-most-preferred execution environment, and so on. Therefore:

ListM={most-preferred(M), second-most-preferred (M), . . . };

where M={m1, m2, m3, . . . }

Note that the client process must be able to provide at least one execution environment for this invention to be applicable. That is, $|M| \geq 1$. Otherwise, there is no way to send dynamic code from the server process to the client process to initialize channel establishment.

In addition, this invention is only applicable to client/server scenarios where $|N|$ $|M| \geq 2$. That is, if there aren't either at least two types of communication channels, or at least two types of execution environments, then obviously there is no decision to make. It is obvious which type of communication channel must be established, and which execution environment will be used to invoke code that creates the communication channel.

The present invention is configured such that:

(a) Code running within a less-preferred execution environment can positively establish when code running in a more-preferred execution environment has failed to establish a communication channel with the server process; or (b) Code running within a more-preferred execution environment can notify code running in a less-preferred execution environment when the more-preferred environment is not able to establish a communication channel with the server process.

That is, a piece of code executing within the client machine must be able to distinguish situations where the code is to attempt to establish a connection versus situations where a more-preferred component of code has been able to establish the connection already. Distinguishing indications may include positive notification, lack of notification within a specified period of time, or notification through other means.

Sequence of Establishing a Communication Channel

Figure 5:
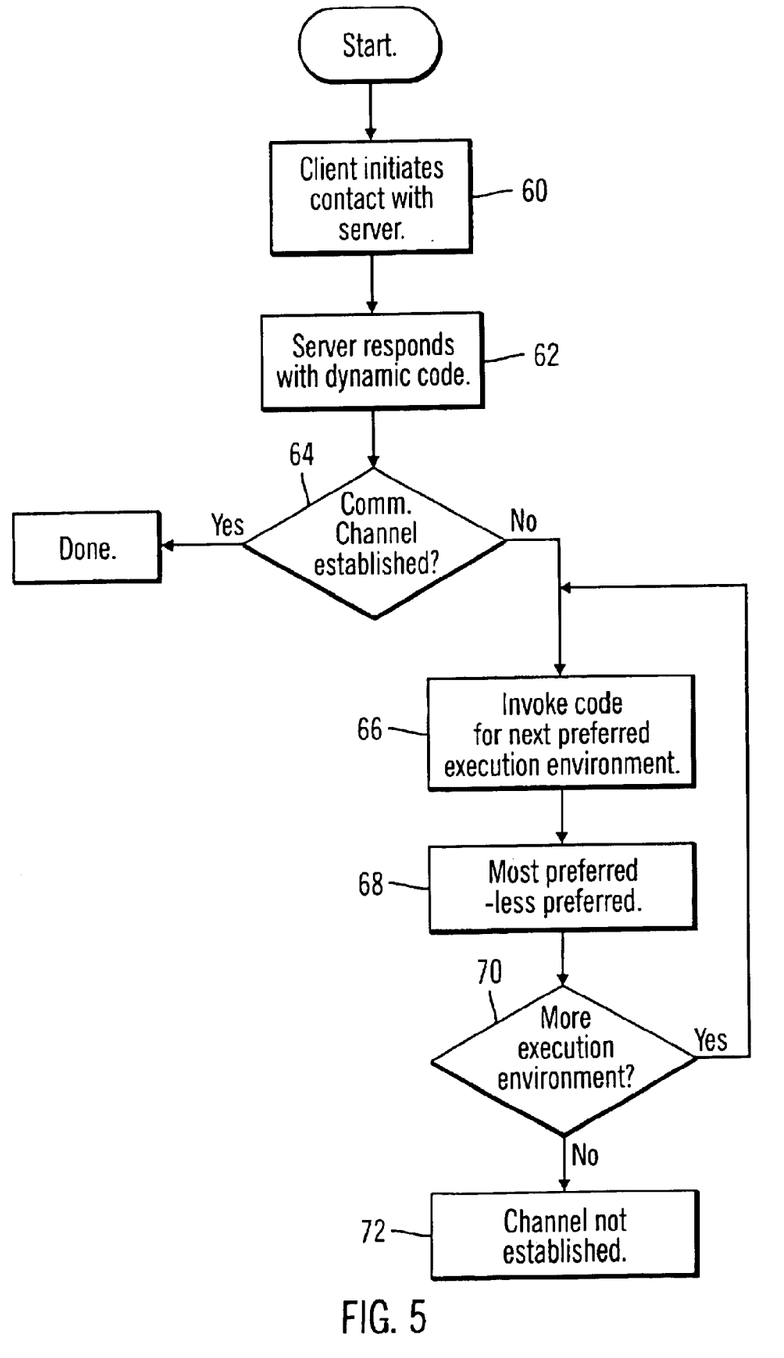
FIG. 5 is a flow diagram of the process for establishing a communication channel.

In reference to FIG. 5, the steps involved in establishing a communication channel may be summarized as follows:

1. Client process initiates contact with the server process through a distinguished network request or notification, such as an HTTP request for a well-known URI. (Step 60.)

2. Server sends response to the request or notification, which includes dynamic code to be invoked within the most-preferred execution environment, and possibly other, less-preferred execution environments. (Step 62.)

3. If most preferred execution environment successfully establishes a communication channel with the server, then the channel has been established and the sequence is DONE. (Step 64.)

4. If, on the other hand, the most-preferred execution environment is unable to establish a connection to the server process, then code for the next-most preferred execution environment must be invoked. Code within the most-preferred execution environment may directly invoke code within the less-preferred environment (positive notification), or code for the less-preferred environment may time-out waiting for positive notification, or code within less-preferred environment may invoke itself when it fails to receive a "stop" signal (no negative notification). (Step 66.)

5. The less preferred execution environment is now the most-preferred execution environment. (Step 68.)

6. If there are more execution environments (step 70), go to step 66 to repeat process to determine preferred execution environments.

7. If there are no more execution environments (step 70), then the channel cannot be established. (Step 72)

Currently Preferred Implementation of the Present Invention

The current implementation of the invention automatically detects an optimal communication channel for communication between services provided by a Java Servlet environment process and a Web browser client process. The browser client process provides up to two different execution environments: a Java virtual machine for executing Applet code, and a JavaScript execution environment.

The particular communication protocol used to communicate between the client process and the server process is designed such that a TCP-based communication channel is preferred over a communication channel built out of an aggregate of HTTP request/response pairs. This is because the cost of establishing a TCP-based connection from the client to the server and sending multiple requests over that connection is cheaper than establishing a new connection to service each single HTTP-embedded request/response.

Therefore, the preferential ordering of the communication channel types is:

{TCP-based channel, multi-HTTP transaction channel}

A combination Java code/JavaScript execution environment is preferred over a Java-only execution environment. Both environments support the creation of TCP-based channels. The combination Java/JavaScript environment requires less code to be downloaded to the client machine, and provides a communication channel in which responses can be more succinctly encoded. The Java-only execution environment is preferred over the JavaScript-only execution environment. The Java code is able to establish single TCP-based communication channel, while the JavaScript execution environment is not. Therefore, the preferential ordering of the execution environments is:

{Combination Java/JavaScript execution environment,
Java Applet code execution environment,
JavaScript execution environment}

In accordance with the present invention, the advantages of the present invention include: (a) the process for establishing the communication channel is transparent to the user, (b) multiple versions of the working code do not have to be supported on the client side; (c) the amount of time the Applet can successfully load and connect to the server can be controlled (this eliminates the user waiting if the Java Virtual Machine loads slowly, for example). In order to accomplish these advantages, the basic implementation of the user interface and any customization should be written in JavaScript. One can build a fully functional system in which all the publishing to the screen is done in JavaScript. The Applet establishes a preferred channel of communication back to the server, through which information is entered into the JavaScript layer. The entire user interface is driven by HTML and JavaScript commands, which are triggered by the preferred communication channel. This is accomplished by the JavaScript translator. The Applet goes through the JavaScript translator 42 and populates the information into JavaScript as depicted in FIG. 2.

While the invention has been described with respect to the described embodiments in accordance therewith, it will be apparent to those skilled in the art that various modifications and improvements may be made without departing from the scope and spirit of the invention. For example, the inventive concepts herein may be applied to wired or wireless system, based on the Internet, IP network, or other network technologies, for financial, informational or other applications, without departing from the scope and spirit of the present invention. Accordingly, it is to be understood that the invention is not to be limited by the specific illustrated embodiments, but only by the scope of the appended claims.

What is claimed is:

1. A system for establishing a communication channel between a client and a server in a distributed network, comprising:
    means configured at the client for automatically determining a client endpoint feature and selecting an optimal communication protocol with the server based on said feature; and
    means for automatically establishing the communication channel between the client and server based on said optimal communication protocol, wherein said optimal communication protocol and said communication channel sustain continuous two-way full duplex communication within a single channel between the client and server.

2. A system as in claim 1 wherein the communication channel is a two-way communication channel that permits the client to stay connected to the server for duration of a client/server session established that is beyond a single client request.

3. A system as in claim 2 wherein the server is configured with an application to establishing full duplex connection to the client, and the client is configured to provide an executable environment capable of establishing full duplex connections to the server in conjunction with said application at the server.

4. A system as in claim 3 wherein said means for automatically determining and selecting comprises a communication agent as a thin-client that is configured to stay connected to the server for the duration of the client/server session.

5. A system as in claim 4 wherein the communication agent is configured to automatically initiate communication with the server, download executable code from the server if not already installed at the client, execute said executable code to detect the most efficient execution environment available, and automatically establish an optimal communication channel with the server.

6. A system as in claim 5 wherein the communication agent comprises a cascading user interface that automatically determines the most efficient and stable way to connect to the server.

7. A system as in claim 6 wherein the cascading user interface is configured to allow the server to automatically supply different levels of service to the client based on the client environment and communication channel selection.

8. A system as in claim 7 wherein the communication agent further comprises a universal JavaScript translator that is configured to translate server commands to JavaScript to facilitate establishing client communication to the server.

9. A system as in claim 8 wherein the communication agent further comprises a browser interrogator that enables the communication agent to detect activities within a user browser to facilitate establishing client communication to the server.

10. A system as in claim 9 wherein a plurality of clients stays connected to a server, wherein at least one of the clients is connected to the server via one or more other clients, wherein said one or more other clients are extensions of the communication agents, such that the server can interact differently with each client, allowing many layers of customization of the server by way of intermediate client or clients connected between a client and the server.

11. A system as in claim 1 wherein the distributed network is the Internet.

12. A client for establishing a communication channel with a server in a distributed network, comprising a communication agent structured and configured to automatically determining a client endpoint feature and selecting an optimal communication protocol with the server based on said feature, and to automatically establishing the communication channel to the server based on said optimal communication protocol, wherein said optimal communication protocol and said communication channel sustain continuous two-way fill duplex communication within a single channel between the client and server.

13. A client as in claim 12 wherein said communication agent comprises a thin-client, which is configured to stay connected to the server for the duration of a client/server session.

14. A client as in claim 13 wherein the communication agent is configured to automatically initiate communication with the server, download executable code from the server if not already installed at the client, execute said executable code to detect the most efficient execution environment available, and automatically establish an optimal communication channel with the server.

15. A client as in claim 14 wherein the communication agent further comprises a cascading user interface that automatically determines the most efficient and stable way to connect to the server.

16. A client as in claim 15 wherein the cascading user interface is configured to allow the server to automatically supply different levels of service to the client based on the client environment and communication channel selection.

17. A client as in claim 16 wherein the communication agent further comprises a universal JavaScript translator that is configured to translate server commands to JavaScript to facilitate establishing client communication to the server.

18. A client as in claim 17 wherein the communication agent further comprises a browser interrogator that enables the communication agent to detect activities within a user browser to facilitate establishing client communication to the server.

19. A process for establishing a communication channel between a client and a server in a distributed network, comprising:

the client automatically determining a client endpoint feature and selecting an optimal communication protocol with the server based on said feature; and automatically establishing the communication channel between the client and server based on said optimal communication protocol, wherein said optimal communication protocol and said communication channel sustain continuous two-way full duplex communication within a single channel between the client and server.

20. A process as in claim 19, further comprising providing a thin-client at the client, which is configured to stay connected to the server for the duration of a client/server session.

* * * * *